United States Patent
Taira

(10) Patent No.: US 9,706,549 B2
(45) Date of Patent: Jul. 11, 2017

(54) RADIO COMMUNICATION APPARATUS AND RADIO COMMUNICATION SYSTEM

(71) Applicant: Akinori Taira, Tokyo (JP)

(72) Inventor: Akinori Taira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 327 days.

(21) Appl. No.: 14/423,555

(22) PCT Filed: Sep. 21, 2012

(86) PCT No.: PCT/JP2012/074223
§ 371 (c)(1),
(2) Date: Feb. 24, 2015

(87) PCT Pub. No.: WO2014/045401
PCT Pub. Date: Mar. 27, 2014

(65) Prior Publication Data
US 2015/0215935 A1    Jul. 30, 2015

(51) Int. Cl.
*H04J 3/00* (2006.01)
*H04W 72/04* (2009.01)
(Continued)

(52) U.S. Cl.
CPC ........ *H04W 72/0446* (2013.01); *H04B 1/715* (2013.01); *H04L 1/08* (2013.01);
(Continued)

(58) Field of Classification Search
CPC ......... H04W 72/0446; H04W 28/0236; H04W 72/0453; H04W 48/00; H04W 72/082;
(Continued)

(56) References Cited

U.S. PATENT DOCUMENTS

| | | |
|---|---|---|
| 5,123,029 A | 6/1992 | Bantz et al. |
| 7,006,451 B2 | 2/2006 | Kuwahara |
| (Continued) | | |

FOREIGN PATENT DOCUMENTS

| | | |
|---|---|---|
| JP | 8-013155 B2 | 2/1996 |
| JP | 09-018916 A | 1/1997 |
| (Continued) | | |

OTHER PUBLICATIONS

International Search Report issued Dec. 18, 2012 in PCT/JP2012/074223 Filed Sep. 21, 2012.
(Continued)

*Primary Examiner* — Afshawn Towfighi
(74) *Attorney, Agent, or Firm* — Oblon, McClelland, Maier & Neustadt, L.L.P.

(57) ABSTRACT

A radio communication apparatus includes a FH control unit controlling frequency hopping for changing a frequency channel for each frame, a carrier sense unit performing carrier sense, for each of slots obtained by dividing the frame, a modulating unit determining transmission timing in the slot on the basis of a result of the carrier sense, a successive-transmission control unit generating a plurality of pieces of same data by duplicating transmission data, and a scheduler allocating, for each slot, a different communication time period to each mobile station. The radio communication apparatus transmits, on the basis of an allocation result of the communication time period, the transmission timing, and the instruction by the hopping control unit, the same data generated from same transmission data to the mobile stations in the frames different from each other and notifies the mobile stations of the allocation result.

25 Claims, 10 Drawing Sheets

(51) Int. Cl.
*H04L 1/08* (2006.01)
*H04W 48/00* (2009.01)
*H04B 1/715* (2011.01)
*H04W 28/02* (2009.01)
*H04W 4/04* (2009.01)
*H04L 29/08* (2006.01)
*H04W 72/08* (2009.01)

(52) U.S. Cl.
CPC ....... *H04W 28/0236* (2013.01); *H04W 48/00* (2013.01); *H04W 72/0453* (2013.01); *H04B 2001/7154* (2013.01); *H04L 67/12* (2013.01); *H04W 4/046* (2013.01); *H04W 72/082* (2013.01)

(58) Field of Classification Search
CPC .................. H04W 4/046; H04B 1/715; H04B 2001/7154; H04L 1/08; H04L 67/12
See application file for complete search history.

(56) References Cited

U.S. PATENT DOCUMENTS

| | | | |
|---|---|---|---|
| 7,016,395 | B2 | 3/2006 | Watanabe et al. |
| 7,046,649 | B2 | 5/2006 | Awater et al. |
| 7,324,486 | B2 | 1/2008 | Noguchi et al. |
| 7,372,866 | B2 | 5/2008 | Jang et al. |
| 7,415,548 | B2 * | 8/2008 | Mahany ............... G06F 15/0225 370/329 |
| 7,729,329 | B2 | 6/2010 | Fujita et al. |
| 7,813,372 | B2 | 10/2010 | Yoshida |
| 8,081,996 | B2 | 12/2011 | Kolavennu et al. |
| 8,204,004 | B2 | 6/2012 | Hamamoto et al. |
| 8,340,716 | B2 | 12/2012 | Sekiya et al. |
| 2008/0247336 | A1 | 10/2008 | Sugitani |
| 2012/0201156 | A1 * | 8/2012 | Sugimoto ............ H04B 1/0064 370/252 |
| 2013/0308685 | A1 * | 11/2013 | Nagai ................... H04W 72/02 375/133 |
| 2014/0206367 | A1 * | 7/2014 | Agee ................ H04W 28/0236 455/450 |
| 2014/0328423 | A1 * | 11/2014 | Agee .................... H04B 7/0413 375/267 |

FOREIGN PATENT DOCUMENTS

| | | |
|---|---|---|
| JP | 09-214403 A | 8/1997 |
| JP | 10-209923 A | 8/1998 |
| JP | 11-041145 A | 2/1999 |
| JP | 2000-165955 A | 6/2000 |
| JP | 2002-010332 A | 1/2002 |
| JP | 2002-198868 A | 7/2002 |
| JP | 3397561 B2 | 4/2003 |
| JP | 3443094 B2 | 9/2003 |
| JP | 3572586 B2 | 10/2004 |
| JP | 2005-079985 A | 3/2005 |
| JP | 2005-286753 A | 10/2005 |
| JP | 3770586 B2 | 4/2006 |
| JP | 3814339 B2 | 8/2006 |
| JP | 4116563 B2 | 7/2008 |
| JP | 4285138 B2 | 6/2009 |
| JP | 2009-171078 A | 7/2009 |
| JP | 2009-225048 A | 10/2009 |
| JP | 2009-538053 A | 10/2009 |
| JP | 2010-050762 A | 3/2010 |
| JP | 2010-193403 A | 9/2010 |
| JP | 4590969 B2 | 12/2010 |
| JP | 2011-009948 A | 1/2011 |
| JP | 2011-114768 A | 6/2011 |
| JP | 4701163 B2 | 6/2011 |
| JP | 4900999 B2 | 3/2012 |
| WO | WO 2012/114937 A1 | 8/2012 |

OTHER PUBLICATIONS

"Part 11: Wireless LAN medium access control (MAC) and physical layer (PHY) specifications", IEEE Standards Associated, IEEE Std 802.11-2012, Mar. 2012, pp. 1441-1488.

"Siemens Transportation Systems: High availability train to wayside communication system for metro applications", ETSI (European Telecommunications Standards Institute), 2008, Slides 1-15.

* cited by examiner

RADIO COMMUNICATION APPARATUS AND RADIO COMMUNICATION SYSTEM

FIELD

The present invention relates to a radio communication apparatus and a radio communication system.

BACKGROUND

In recent years, the introduction of a radio train control system that abolishes signals besides a railroad track and performs train control using radio is in progress. The system transmits information directly related to safe operation of trains such as speed and stop positions. Therefore, the system requires a radio system to have extremely highly reliable communication performance. In particular, when the system is established using an ISM (Industry Science Medical) band because, for example, an exclusive frequency cannot be secured for train control, it is likely that the radio transmission is interfered by an uncontrollable interference signal. It is necessary to realize a function for surely delivering information even under the presence of a large interference signal.

As a communication system excellent in interference resistance, a system using a DSSS (Direct Sequence Spread Spectrum) is proposed (e.g., Non Patent Literature 1). When a plurality of frequency channels can be used, an interference avoidance method by an FHSS (Frequency Hopping Spread Spectrum) is also proposed (e.g., Non Patent Literature 2). In particular, a communication system using the FHSS has high interference avoidance performance and is widely used in communication systems required to have high reliability. For example, Patent Literature 1 discloses an FHSS system that temporally divides a frame used for transmission into a non-collision access portion controlled by a base station and a random access portion, where collision occurs, to realize efficient communication. Patent Literature 2 discloses a method for improving reliability through "successive transmission" for transmitting data same as the FHSS a plurality of times.

CITATION LIST

Patent Literature

Patent Literature 1: Japanese Patent Publication No. H8-13155
Patent Literature 2: Japanese Patent Application Laid-Open No. H9-214403

Non Patent Literature

Non Patent Literature 1: SIEMENS, "Siemens Transportation Systems", ETSI (European Telecommunications Standards Institute) November 2008 Conference Material, December 2008
Non Patent Literature 2: IEEE standard 802, "Part II: Wireless LAN Medium Access Control (MAC) and Physical Layer (PHY) Specifications", Chapter 14, March 2012

SUMMARY

Technical Problem

According to the related art, it is possible to improve interference resistance under the control of the same system or a single base station. However, for example, in an environment in which completely different systems coexist like an ISM band, there is a problem in that sufficient improvement of the interference resistance cannot be obtained. In particular, in recent years, wireless LANs (Local Area Networks) (IEEE (Institute of Electrical and Electronic Engineers) 802.11b, IEEE802.11g, and IEEE802.11n) using an ISM band are increasing. Therefore, it is difficult to realize highly reliable communication with the system of Non Patent Literature 2 and the like that adopt access systems same as the wireless LANs.

The present invention has been devised in view of the above and it is an object of the present invention to obtain a radio communication apparatus and a radio communication system that can realize highly reliable communication even in an environment in which an interference source is present.

Solution to Problem

In order to solve the above problems and achieve the object, the present invention relates to a radio communication apparatus including: a hopping control unit that controls frequency hopping for changing a frequency channel every predetermined switching cycle and gives an instruction concerning a frequency channel to be used in communication every switching cycle; a carrier sense unit that performs, for each of allocation units obtained by dividing the switching cycle, carrier sense on a frequency channel to be used; an interference-avoidance-timing control unit that determines transmission timing in the allocation unit on a basis of a result of the carrier sense; a successive-transmission control unit that generate a plurality of pieces of same data by duplicating transmission data; and a scheduler that allocates, for each of the allocation units, a different communication time period to each of communication partners, wherein the radio communication apparatus transmits, on a basis of an allocation result of the communication time period by the scheduler, the transmission timing, and the instruction by the hopping control unit, the plurality of pieces of same data generated from same transmission data to the communication partners at the switching cycles different from each other and notifies the communication partners of the allocation result.

Advantageous Effects of Invention

The radio communication apparatus and the radio communication system according to the present invention attain an effect that it is possible to realize highly reliable communication even in an environment in which an interference source is present.

DESCRIPTION OF EMBODIMENTS

Exemplary embodiments of a radio communication apparatus and a radio communication system according to the present invention are explained in detail below with reference to the drawings. Note that the present invention is not limited by the embodiments.

First Embodiment

Figure 1:
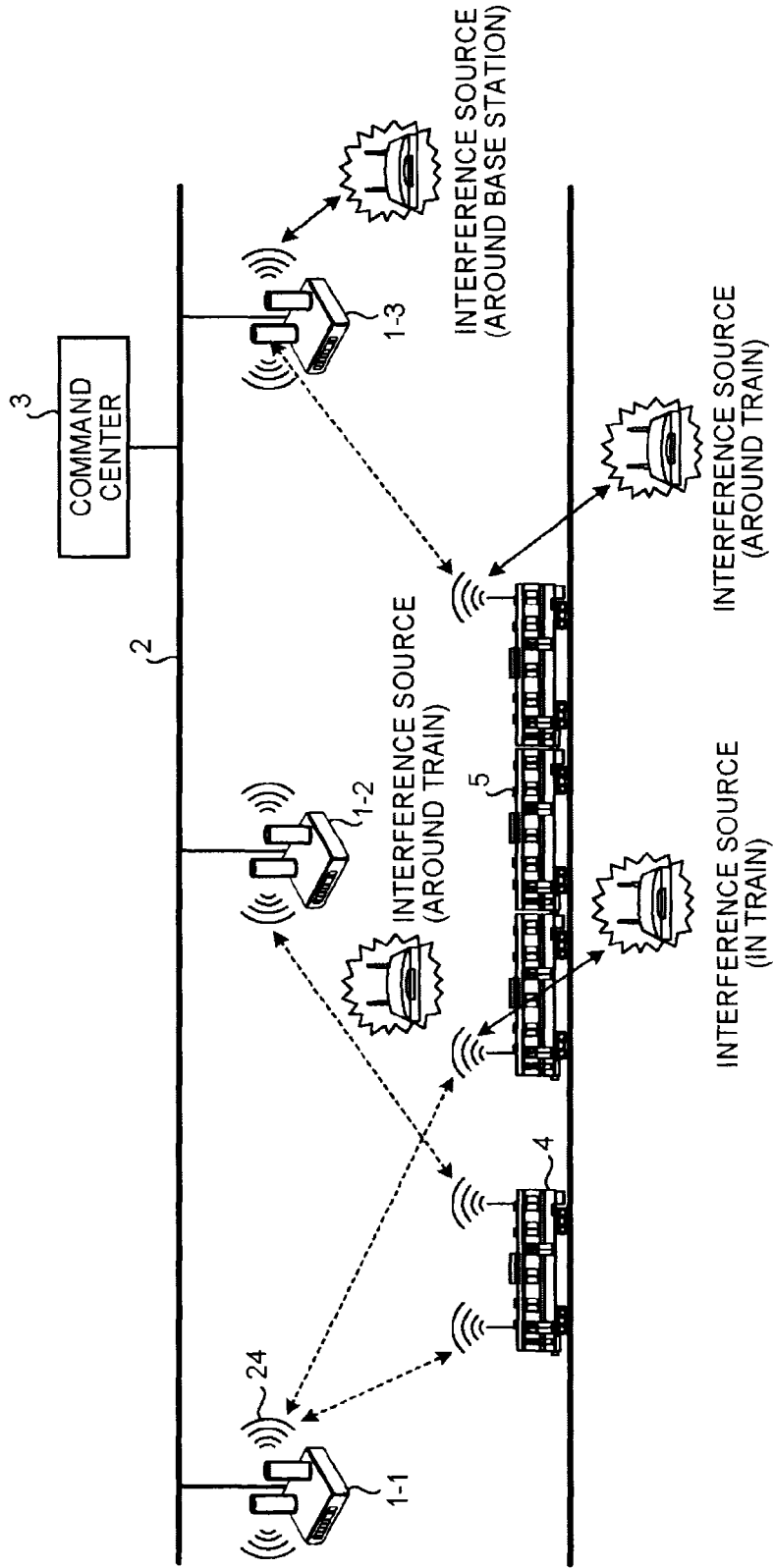
FIG. 1 is a diagram of a configuration example of a radio communication system in a first embodiment.

FIG. 1 is a diagram of a configuration example of a first embodiment of the radio communication system according to the present invention. The radio communication system in the present embodiment includes base stations 1-1 to 1-3, which are radio communication apparatuses, set besides a railroad track and trains 4 and 5, which travel on the railroad track and respectively include mobile stations, which are radio communication apparatuses. The base stations 1-1 to 1-3 are arranged at certain intervals such that they can continuously maintain communication with a train traveling on the railroad track. The base stations 1-1 to 1-3 are connected to one another with a backbone line (an inter-base station network) 2 and capable of transmitting and receiving information to and from a command center 3 through the backbone line 2. The radio communication system in the present embodiment configures a train control system and performs transmission and reception of information for control of train service and the like.

The base stations 1-1 to 1-3 respectively carry out radio communication with trains in their own cells, transmit information received from the trains to the command center 3, and transmit information transmitted from the command center 3 to the trains to thereby realize information transmission between the command center 3 and the trains. The positions of the trains 4 and 5 change according to traveling. However, the trains 4 and 5 maintain information transmission to and from the command center 3 by switching the base stations 1-1 to 1-3 that are communication partners of the trains 4 and 5.

FIG. 1 shows an example of an interference source concerning communication between the train 5 (the mobile station mounted on the train 5) and the base stations 1-1 to 1-3. In the example shown in FIG. 1, interference sources that use the same frequency band as that for communication between the train 5 and the base stations 1-1 to 1-3 are present in the train 5, around the train 5, and around the base station 1-3. The interference sources interfere with the communication between the base stations and the train. When an ISM band is used for the communication between the train 5 and the base stations 1-1 to 1-3, for example, wireless LAN communication becomes an interference source. However, the interference sources are not limited to this.

Figure 2:
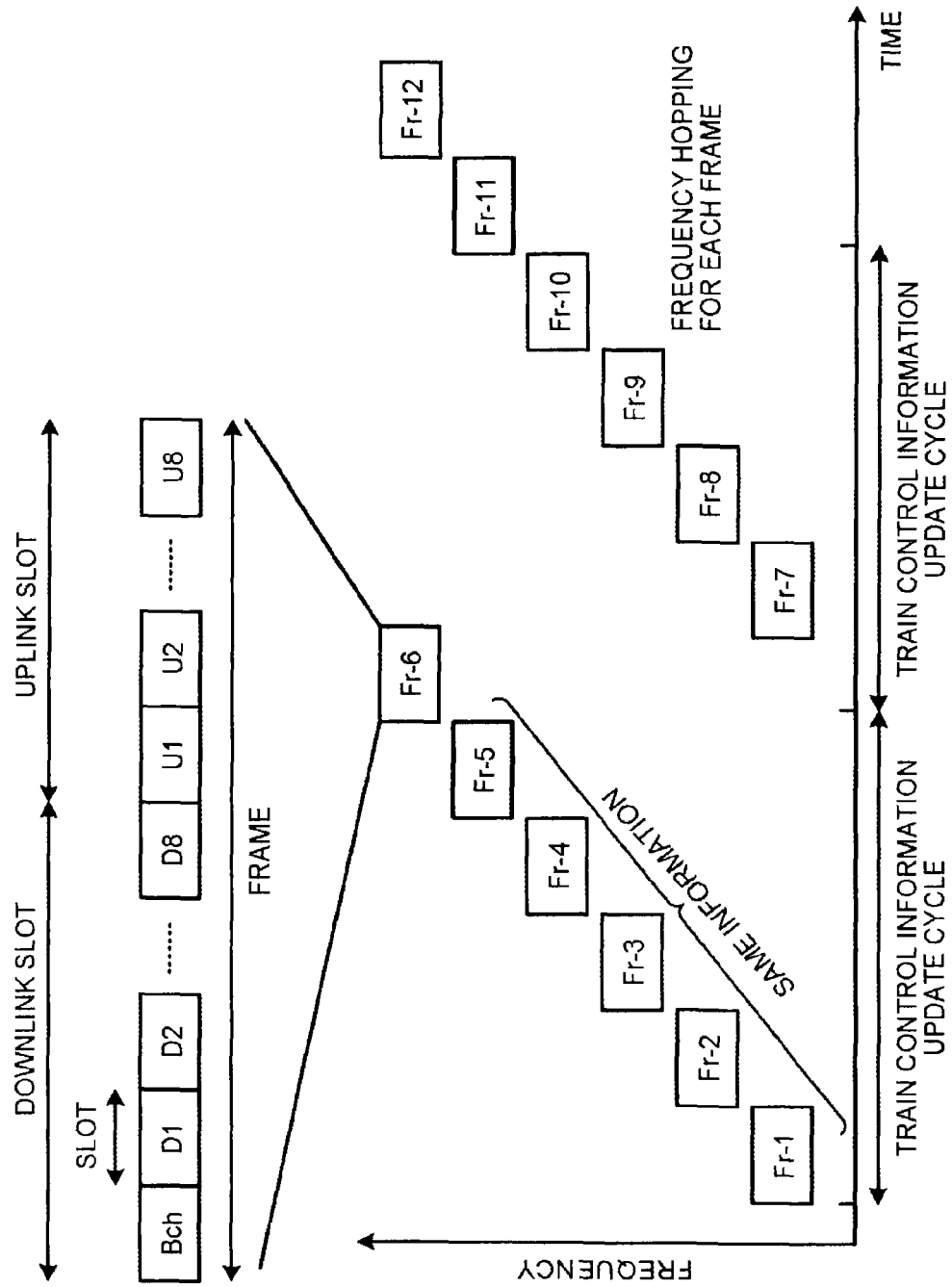
FIG. 2 is a diagram of an example of a frame format used in the first embodiment.

FIG. 2 is a diagram of an example of a frame format used in the present embodiment. One frame is temporally divided into a downlink, which is communication from the base stations 1-1 to 1-3 to the train, and an uplink, which is communication from the train to the base stations 1-1 to 1-3. The downlink and the uplink are each divided into a plurality of slots (allocation units), to which different kinds of information are allocated. A broadcast slot (Bch) is present in a frame head. In the broadcast slot, notification information, frame configuration information, and the like are provided.

In FIG. 2, Fr-1, Fr-2, Fr-3, and the like indicate frames. D1, D2, and the like indicate slots. In the example shown in FIG. 2, a downlink slot indicating a time period of the downlink is configured from the broadcast slot and slots D1 to D8. An uplink slot indicating a time period of the uplink is configured from slots U1 to U8.

In general, the amount of information used for train control is small. Therefore, an update cycle for train control information is long compared with a frame cycle of radio transmission. Therefore, it is possible to transmit a plurality of frames during one cycle of train control information update (a train control information update cycle). In the example shown in FIG. 2, it is possible to transmit five frames in one train control information update cycle. Note that FIG. 2 is an example, and the number of frames that can be transmitted in one train control information update cycle is not limited to this example.

To improve reliability of the train control information, the same train control information is transmitted a plurality of times by a plurality of frames (successive transmission). FIG. 2 shows an example in which one piece of train control information is transmitted five times (successively transmitted five times). However, the number of times of successive transmission is not limited to this. In the present embodiment, to avoid interference with other systems, frequency hopping (FH) is carried out with one frame set as a switching cycle for switching a frequency. In this way, the frequency is switched in frame units and the successive transmission is performed in frame units, whereby the same data is transmitted on a plurality of frequency channels. When data is transmitted on a single frequency channel, if an interference signal is present in the frequency channel, information transmission is hindered. However, when the successive transmission is performed while changing a frequency channel, even if there is a frequency channel in which an interference signal is present, information transmission can be performed using other frequency channels; therefore, it is possible to improve reliability.

Figure 3:
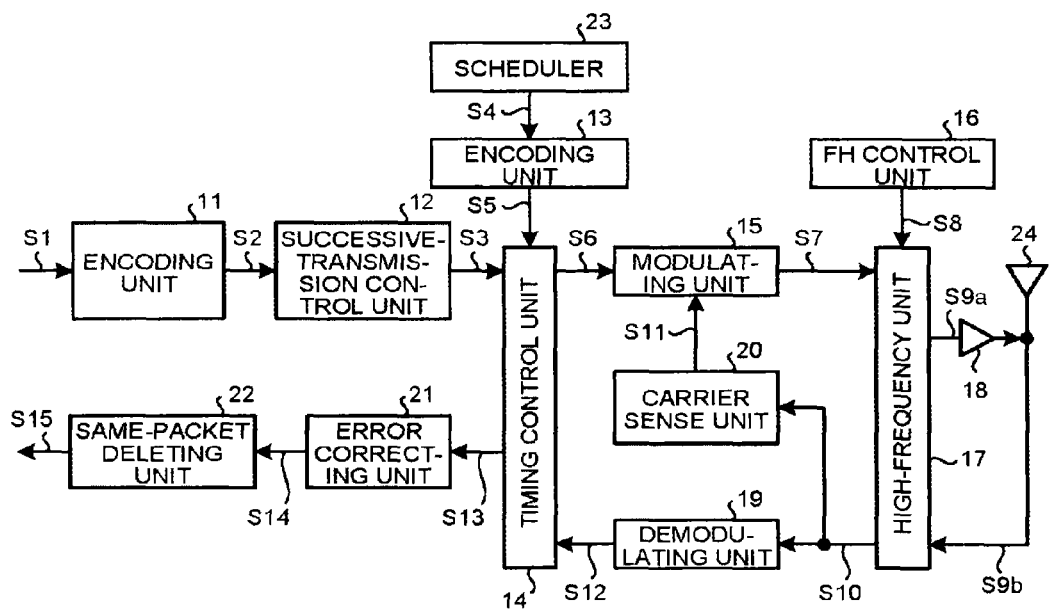
FIG. 3 is a diagram of a configuration example of a base station in the first embodiment.

FIG. 3 is a diagram of a configuration example of the base stations 1-1 to 1-3 in the present embodiment. As shown in FIG. 3, the base stations 1-1 to 1-3 each include encoding units 11 and 13, a successive-transmission control unit 12, a timing control unit 14, a modulating unit 15, an FH control unit (hopping control unit) 16, a high-frequency unit 17, an amplifier 18, a demodulating unit 19, a carrier sense unit 20, an error correcting unit 21, a same-packet deleting unit 22, a scheduler 23, and an antenna 24.

The encoding unit 11 encodes transmission data S1 to be transmitted to the trains in its own cell to generate encoded data S2. The successive-transmission control unit 12 duplicates the encoded data S2 to obtain a plurality of transmission packets S3 and controls successive transmission. The scheduler 23 allocates data to the slots of the temporally divided uplink and downlink and generates notification information/frame configuration information S4. The frame configuration information is information indicating the configuration of a frame and includes information concerning a destination of data of each of the slots. The encoding unit 13 encodes the notification information/frame configuration information S4 generated by the scheduler 23 to generate a transmission packet S5. The timing control unit 14 outputs, on the basis of the frame configuration information from the scheduler 23, transmission packet information S6 in the slots to the modulating unit 15 at the transmission timings of the transmission packets S3 and S5 (output timing to the modulating unit 15). The timing control unit 14 controls the reception timing of a reception packet addressed to its own station on the basis of the frame configuration information and outputs, to the error correcting unit 21, a reception packet S13 addressed to its own station in a demodulated signal S12 generated by the demodulating unit 19.

The modulating unit 15 modulates the transmission packet information S6 in the slots and outputs a baseband modulation signal S7 on the basis of carrier sense information S11 input from the carrier sense unit 20. During transmission, the high-frequency unit 17 converts, on the basis of frequency control information S8 from the FH control unit 16, the baseband modulation signal S7 into a high-frequency signal S9a having an RF (Radio Frequency) frequency designated by the frequency control information S8. During reception, the high-frequency unit 17 converts a high-frequency signal S9b received by the antenna 24 into a baseband reception signal S10. The amplifier 18 amplifies the high-frequency signal S9a and outputs the high-frequency signal S9a to the antenna 24. The antenna 24 radiates the high-frequency signal S9a after the amplification as a radio wave. The antenna 24 receives a radio wave and outputs the radio wave to the high-frequency unit 17 as the high-frequency signal S9b.

The demodulating unit 19 demodulates the baseband reception signal S10 to generate the demodulated signal S12. The carrier sense unit 20 observes the baseband reception signal S10 and generates, on the basis of the observation result, the carrier sense information S11 indicating whether a signal having an intensity equal to or higher than a predetermined value is present. The error correcting unit 21 performs error correction on the reception packet S13 to generate reception information S14. The same-packet deleting unit 22 deletes a redundant portion of the successively transmitted reception information S14 to generate a final demodulator output S15. For example, when data is successively transmitted five times, the same-packet deleting unit 22 selects data, for which error correction can be correctly carried out, among five pieces of the same data, sets the data as the modulator output S15, and deletes the other four pieces of the same data. When there are a plurality of pieces of data, for which error correction can be correctly carried out, among the five pieces of the same data, the same-packet deleting unit 22 sets one of the pieces of data as the demodulator output S15 and deletes the other pieces of the same data.

Figure 4:
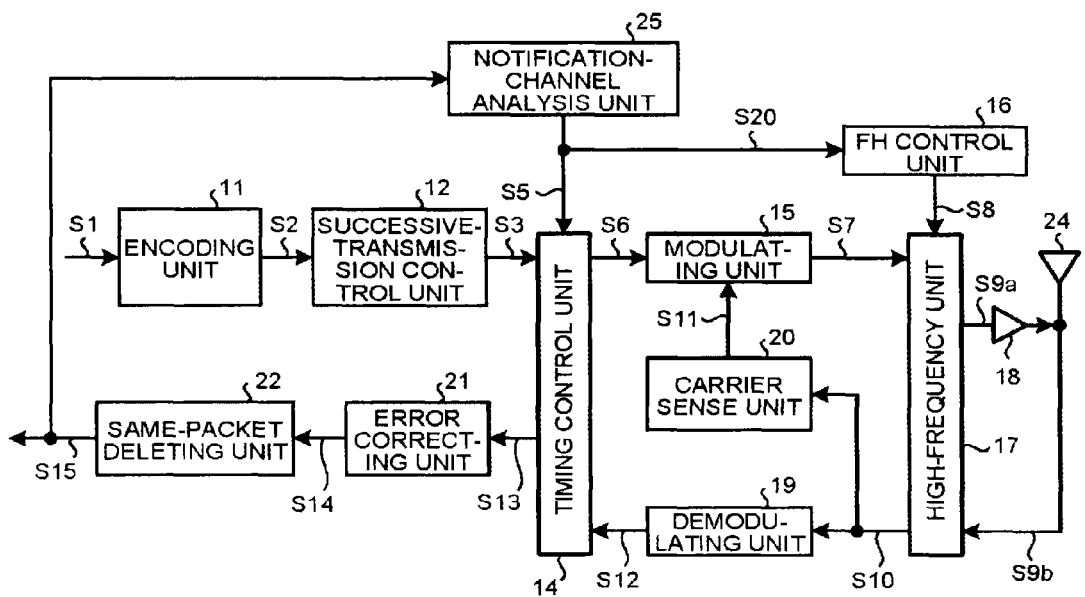
FIG. 4 is a diagram of a configuration example of a mobile station in the first embodiment.

FIG. 4 is a diagram of a configuration example of the mobile station in the present embodiment. The mobile station in the present embodiment is mounted on the trains 4 and 5. In FIG. 4, constituent elements having the same functions as the functions of the base stations 1-1 to 1-3 shown in FIG. 3 are denoted by reference numerals and signs same as the reference numerals and signs in FIG. 2. Redundant explanation of the constituent elements is omitted. As shown in FIG. 4, the mobile station has a configuration in which the scheduler 23 and the encoding unit 13 are deleted from the configuration of the base stations 1-1 to 1-3 shown in FIG. 3 and a notification-channel analysis unit (an analysis unit) 25 is added. The notification-channel analysis unit 25 analyzes information concerning a notification channel in the demodulator output S15, generates transmission and reception timing information (an allocation result of a communication time period) on its own station and frequency information S20 for FH, inputs the transmission and reception timing information to the timing control unit 14, and inputs the frequency information S20 for FH to the FH control unit 16.

The operation of the base stations 1-1 to 1-3 in the present embodiment is explained. First, the scheduler 23 performs scheduling on the trains (the mobile stations mounted on the trains) housed in its own cell, determines slots used by each train concerning the downlink and the uplink to generate frame configuration information, and generates notification information. That is, the scheduler 23 allocates a communication time period in a time division manner to each of the mobile stations in the same cell to thereby prevent interference among the mobile stations. The notification information includes frequency hopping information (a frequency hopping pattern and switching timing) managed by the FH control unit 16. Subsequently, the encoding unit 11 performs encoding on the transmission data S1 for the trains obtained from the command center 3 through the backbone line 2. The successive-transmission control unit 12 performs duplication processing for successive transmission to generate the transmission packets S3. The timing control unit 14 allocates the transmission packets S3 for the trains to the slots on the basis of the frame configuration information from the scheduler 23 and sends the transmission packets S3 to the modulating unit 15 as the transmission packet information S6.

Figure 5:
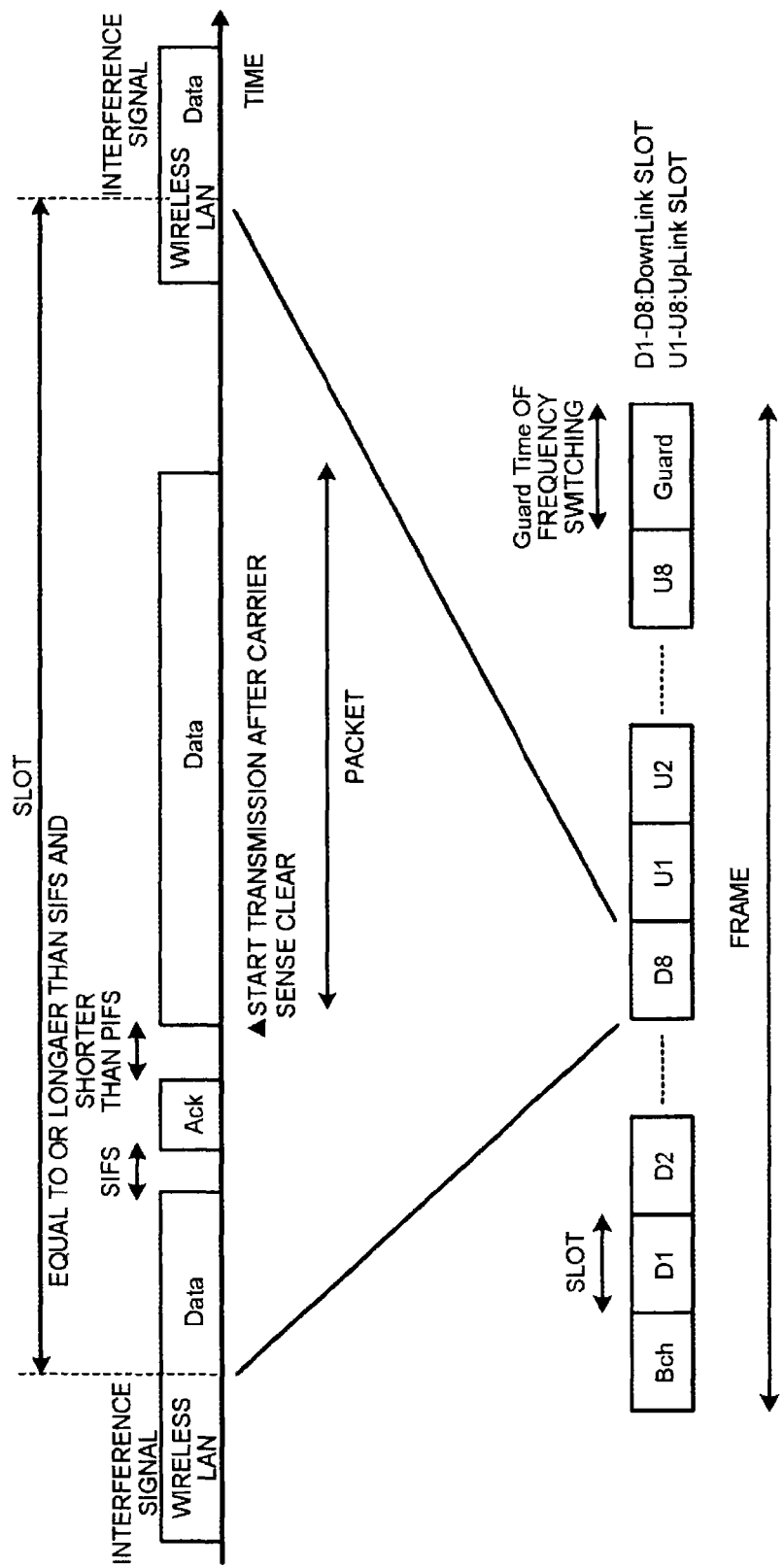
FIG. 5 is a diagram of an example of a relation between interference and packet transmission from the base station.

A relation between interference from a wireless LAN and transmission packets from the base stations 1-1 to 1-3 is explained. FIG. 5 is a diagram of an example of the relation between the interference and the packet transmission from the base stations 1-1 to 1-3. When transmission from the wireless LAN is performed at the same frequency as the communication of the base stations 1-1 to 1-3, if the base stations 1-1 to 1-3 perform transmission, interference occurs and information transmission is hindered. Therefore, in the present embodiment, the base stations 1-1 to 1-3 carry out carrier sense in the slots of the downlink allocated to the base stations 1-1 to 1-3 and, after confirming a transmission end of the wireless LAN (carrier sense clear), transmit information for trains. In this case, for example, the base stations 1-1 to 1-3 determine, as the transmission timing of the slots, a point in time when it is confirmed that there is no transmission (interference) from other stations for a fixed time. For example, the base stations 1-1 to 1-3 carry out transmission from their own stations at a point in time when it is confirmed that there is no transmission (interference) from other stations over the time length that is equal to or longer than an SIFS (Short Interframe Space) and equal to or shorter than a PIFS (PCF (Point Coordination Function) Interframe Space) after clearing the carrier sense. This is for the purpose of avoiding interference from the wireless LAN and obtaining a right to use a channel prior to transmission stations of the other wireless LANs. Values of the SIFS and the PIFS are different depending on a wireless LAN system. Therefore, this standby time is determined taking into account a type of a wireless LAN used in the periphery. To realize the operation described above, the slot length is set longer than the transmission packet length. Concerning the SIFS and PIFS, please refer to Non Patent Literature 2. Note that, even if the time during which a transmission packet can be transmitted in a slot (time obtained by subtracting time required for transmission of the transmission packet from the end time of the slot) elapses, when it cannot be confirmed that there is no transmission from other stations for the fixed time, transmission in the slot is not performed.

Specifically, the carrier sense unit 20 carries out the carrier sense to generate the carrier sense information S11. The modulating unit 15 generates, on the basis of the carrier sense information S11, the modulation signal S7 at the transmission timing for avoiding interference with other systems as explained above and sends the modulation signal S7 to the high-frequency unit 17. Note that the FH control unit 16 manages, for each of the base stations 1-1 to 1-3, a frequency hopping pattern and switching timing that should be used. The FH control unit 16 outputs, on the basis of managed these pieces of information, every switching timing, the frequency control information S8 for designating an RF frequency to the high-frequency unit 17. The high-frequency unit 17 converts, on the basis of the frequency control information S8, the baseband modulation signal S7 into the high-frequency signal S9a in a designated high-frequency band. The high-frequency signal S9a is amplified by the amplifying unit amplifier 18 and transmitted from the antenna 24.

In the present embodiment, the modulating unit 15 has a function of calculating, on the basis of the carrier sense information S11, the transmission timing for avoiding interference with other systems as explained above. That is, the modulating unit 15 has a function of an interference-avoidance-timing control unit that calculates, on the basis of the carrier sense information S11, the transmission timing for avoiding interference with other systems as explained above. Alternatively, it is also possible that the interference-avoidance-timing control unit is provided separately from the modulating unit 15 and the modulating unit 15 sends the modulation signal S7 to the high-frequency unit 17 on the basis of an instruction from the interference-avoidance-timing control unit.

In an uplink slot period, the demodulating unit 19 demodulates the baseband reception signal S10 converted by the high-frequency unit 17 to generate the demodulated signal S12. The timing control unit 14 determines the reception timing for its own station on the basis of the frame configuration information, selects the reception packet S13 addressed to its own station from the demodulated signal S12 on the basis of the reception timing, and outputs the reception packet S13 to the error correcting unit 21. The error correcting unit 21 performs error correction processing on the reception packet S13 to generate the reception information S14. The same-packet deleting unit 22 deletes a redundant packet due to successive transmission from the reception information S14 to generate the final demodulator output S15.

The operation of the mobile station mounted on the trains 4 and 5 in the present embodiment is explained. The operation of the mobile stations is substantially the same as the operation of the base stations 1-1 to 1-3 except that transmission and reception timing information on their own stations and the frequency information S20 for FH are obtained from notification information from the base stations 1-1 to 1-3. That is, in the mobile station, the notification information from the base stations 1-1 to 1-3 is analyzed by the notification-channel analysis unit 25, whereby the frequency information S20 for FH such as slot numbers allocated to its own station and FH patterns to be used by the base stations 1-1 to 1-3 is obtained. The mobile station avoids, on the basis of these pieces of information, interference with other systems through the carrier sense in a similar manner to the base stations 1-1 to 1-3 and performs transmission and reception to and from the base stations 1-1 to 1-3.

Note that the train control information update cycle and the number of times of successive transmission do not need to be the same in all the trains and can be adaptively changed for each of the trains according to urgency and severity of transmission information. Concerning the same train, a different number of times of successive transmission can be set for each link. FIG. 3 and FIG. 4 show examples in which information is successively transmitted (duplicated) after the same encoding is carried out. However, the information to be successively transmitted means that original transmission information is the same. After the transmission information is duplicated, different encoding can be performed on each piece of the duplicated transmission information. A different modulation scheme can be performed on each piece of the duplicated transmission information to transmit the transmission information.

Note that, in the example explained above, the radio communication system in the present embodiment is used for the train control system. However, the radio communication system in the present embodiment can be used for a system other than the train control system.

As explained above, in the present embodiment, in the communication between the base stations 1-1 to 1-3 and the mobile stations, the base stations 1-1 to 1-3 allocate the communication time in a time division manner to the mobile stations in their own cells, successively transmit the same transmission data, perform the frequency hopping, and, in the switching cycle of the frequency hopping, carry out the transmission from their own stations after performing the carrier sense and clearing the carrier sense. Therefore, even in an environment in which uncontrollable interference is present like the ISM band, it is possible to avoid a lack of information due to interference and establish a highly reliable radio communication line. By changing the update frequency and the number of times of successive transmission of the train control information to be transmitted depending on the importance, it is possible to establish a radio line having a plurality of reliability levels in one radio system.

Second Embodiment

Figure 6:
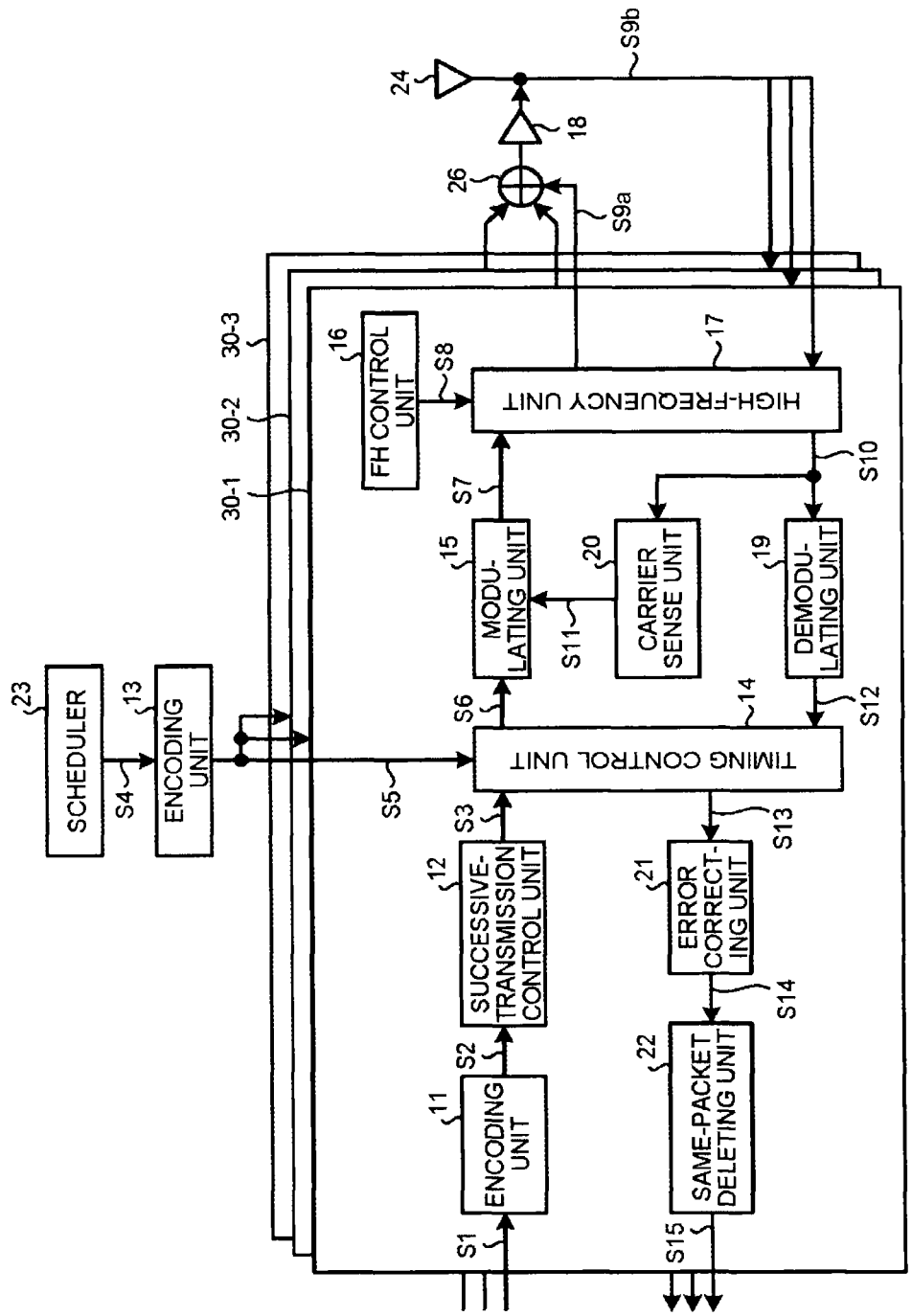
FIG. 6 is a diagram of a configuration example of a base station in a second embodiment.

FIG. 6 is a diagram of a configuration example of a second embodiment of the base station according to the present invention. As shown in FIG. 6, the base station in the present embodiment includes transmission and reception modules 30-1 to 30-3 each including the encoding unit 11, the successive-transmission control unit 12, the timing control unit 14, the modulating unit 15, the FH control unit 16, the high-frequency unit 17, the demodulating unit 19, the carrier sense unit 20, the error correcting unit 21, and the same-packet deleting unit 22, the scheduler 23, the encoding unit 13, a combining unit 26, the amplifier 18, and the antenna 24. A radio communication system in the present embodiment is the same as the radio communication system in the first embodiment except that the base stations 1-1 to 1-3 are the base station of the present embodiment and the mobile stations mounted on the trains 4 and 5 are a mobile station in the present embodiment. Constituent elements having the same functions as the functions in the first embodiment are denoted by reference numerals and signs same as the reference numerals and signs in the first embodiment. Redundant explanation of the constituent elements is omitted. Differences from the first embodiment are mainly explained below.

In the first embodiment, communication is performed according to a single FH pattern. However, in the present embodiment, an increase in the communication capacity is realized by carrying out communication using a plurality of FH (frequency hopping) patterns.

In the example shown in FIG. 6, three kinds of FH patterns are used. Therefore, the base station includes three transmission and reception modules. The number of FH patterns is not limited to this. The base station can include any number of kinds of FH patterns and only has to include modules corresponding to the FH patterns.

It is possible to realize a highly reliable and large-capacity communication system by using a plurality of FH patterns when large-capacity information transmission is necessary. Even when a plurality of FH patterns are used, it is possible to establish a radio line having a plurality of reliability levels by increasing and decreasing the number of times of successive transmission.

Figure 7:
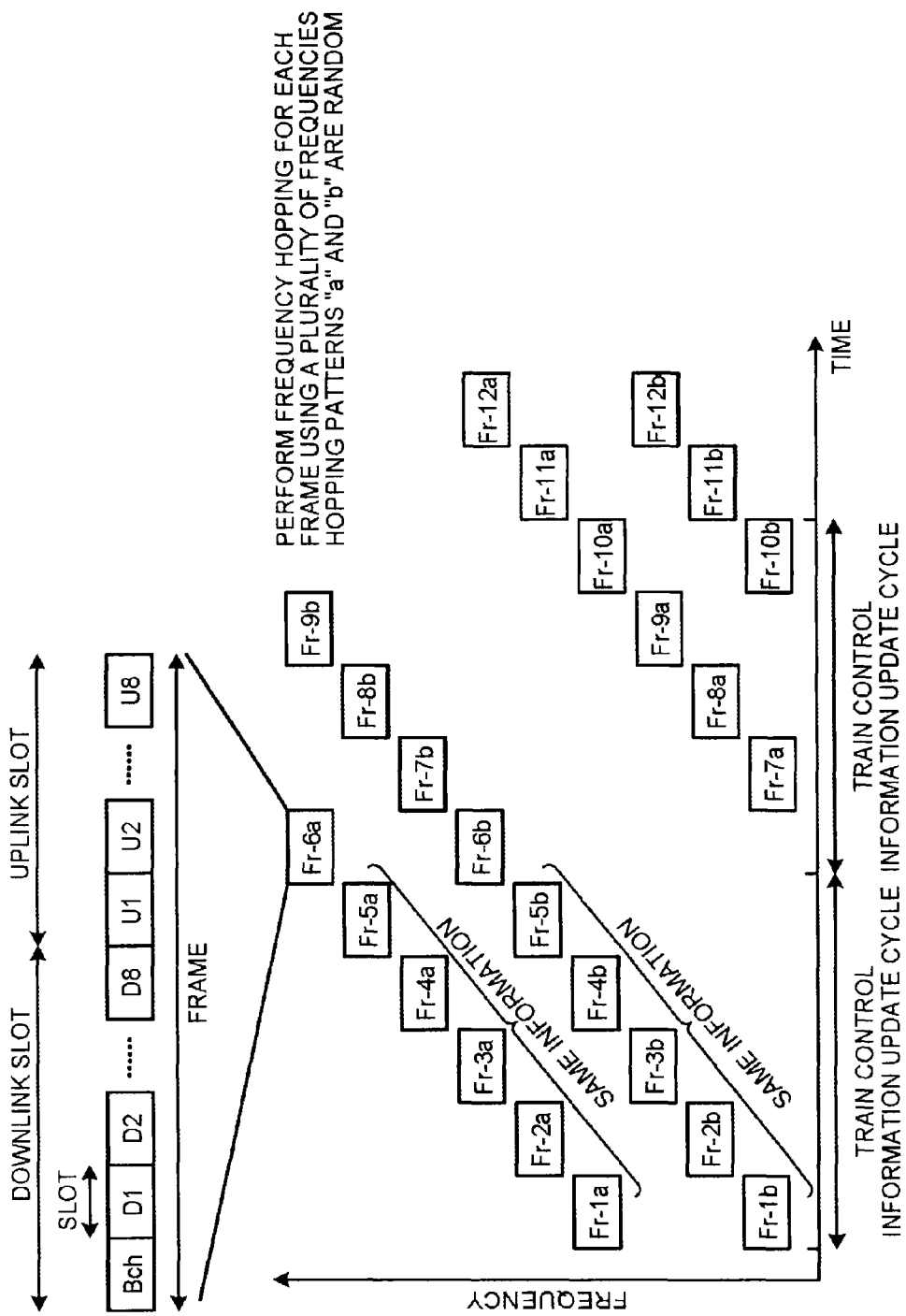
FIG. 7 is a diagram of an example of FR patterns in the second embodiment.

FIG. 7 is a diagram of an example of FH patterns in the present embodiment. In FIG. 7, for simplification, two kinds of FH patterns, i.e., patterns "a" and "b" are shown. The pattern "a" and the pattern "b" are set such that frequency channels different from each other are used at the same time. In this way, if transmission data is transmitted in the patterns "a" and "b" using the two kinds of FH patterns, a transmittable communication capacity increases to double the communication capacity when transmitting transmission data using a single FH pattern. Note that the FH patterns only have to be set such that frequency channels different from each other are used at the same time and are not limited to the example shown in FIG. 2. When three or more FH patterns are used, similarly, the FH patterns are set such that frequency channels different from one another are used as the same time.

The operation in the present embodiment is explained. The scheduler 23 divides a frame of each of a plurality of FH patterns into a plurality of slots as in the first embodiment. The scheduler 23 allocates a combination of slot numbers and an FH pattern to trains in its own cell according to the amount of information necessary for the trains and the degree of importance, sets the result of the allocation as frame configuration information, and outputs the notification information/frame configuration information S4 to the encoding unit 13. The notification information includes information concerning the FH patterns and switching timings. The encoding unit 13 outputs the transmission packet S5 obtained by encoding the notification information/frame configuration information S4 to the transmission and reception modules 30-1, 30-2, and 30-3. The transmission and reception modules 30-1, 30-2, and 30-3 respectively correspond to three FH patterns. The transmission and reception modules 30-1, 30-2, and 30-3 adjust the transmission timings according to this allocation information S5 and perform communication. The operation in the transmission and reception modules 30-1, 30-2, and 30-3 is the same as the operation in the first embodiment.

The high-frequency signals S9a output from the high-frequency units 17 of the transmission and reception modules 30-1, 30-2, and 30-3 are combined by the combining unit 26 and, after being amplified by the amplifier 18, transmitted to the antenna 24. During reception, the high-frequency signal S9b received by the antenna 24 is divided into three signals, which are respectively input to the transmission and reception modules 30-1, 30-2, and 30-3.

As in FIG. 4 in the first embodiment, the mobile stations mounted on the trains 4 and 5 are configured to include, in the configuration of the base station shown in FIG. 6, the notification-channel analysis unit 25 instead of the scheduler 23 and the encoding unit 13. The notification-channel analysis unit 25 analyzes information concerning a notification channel (notification information), outputs, for each of the FH patterns, frame configuration information to the timing control units 14 of the transmission and reception modules 30-1 to 30-3 corresponding to the FH patterns, and outputs the FH patterns and switching timings to the FH control units 16 of the corresponding transmission and reception modules 30-1 to 30-3. Specifically, for example, when patterns #1, #2, and #3 respectively correspond to the transmission and reception modules 30-1, 30-2, and 30-3, the notification-channel analysis unit 25 outputs frame configuration information on the pattern #1 to the timing control unit 14 of the transmission and reception module 30-1 and outputs an FH pattern and switching timing of the pattern #1 to the FH control unit 16 of the transmission and reception module 30-1.

Note that transmission timings in the slots need to be the same timing in all the FH patterns. This is because the transmission timings are different from the timing of carrier sense and it is likely that transmission of a certain FH pattern activates carrier sense of the other FH patterns. Therefore, in the present embodiment, unlike the first embodiment, when it is confirmed that the carrier sense is not carried out for a period that is equal to or longer than the SIFS in frequency channels used in all the FH patterns, transmission is performed at the same timing among the FH patterns.

In the configuration shown in FIG. 6, the amplifier 18 and the antenna 24 are shared by a plurality of FH patterns and the transmission and reception modules each include the high-frequency units 17. However, it is also possible that the transmission and reception modules 30-1, 30-2, and 30-3 share the high-frequency unit 17 as well and signal combination and separation in the transmission and reception modules 30-1, 30-2, and 30-3 are performed by performing digital signal processing of a baseband.

As explained above, in the present embodiment, a plurality of FH patterns are used to carry out transmission and reception operations same as the transmission and reception operations in the first embodiment in the respective FH patterns. Therefore, it is possible to establish a communication system that attains both of high reliability and a large capacity. Further, because allocation of the frequency direction (the number of FH patterns) is possible in addition to the time direction (the number of times of successive transmission and the number of slots), it is possible to set a radio line having a more variety of reliability levels.

Third Embodiment

Figure 8:
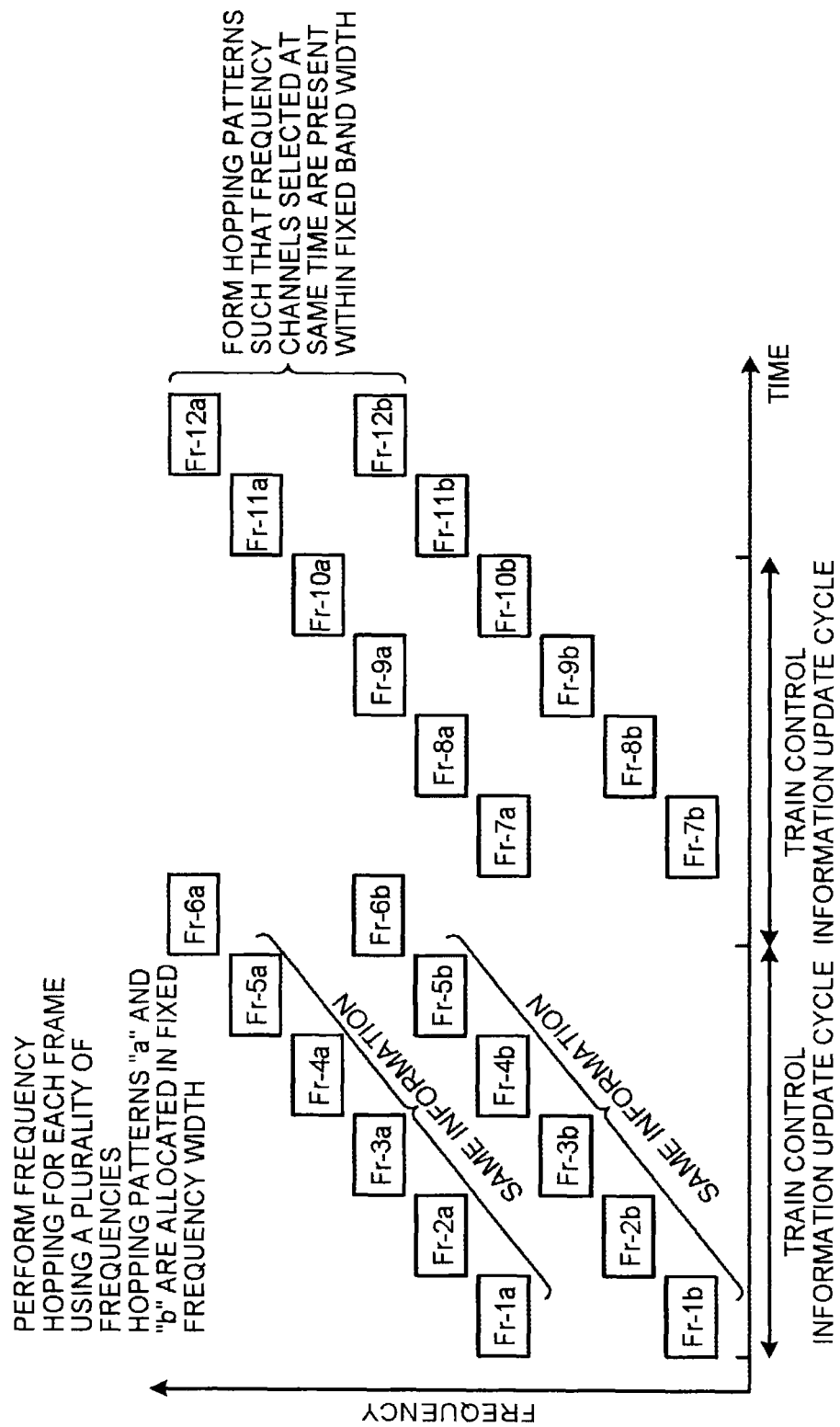
FIG. 8 is a diagram of an example of a selection method for a frequency channel in a third embodiment.

FIG. 8 is a diagram of an example of a selection method for a frequency channel in a third embodiment of the present invention. The configuration of a radio communication system in the present embodiment is the same as the configuration in the second embodiment. The configurations of a base station and a mobile station are also the same as the configurations in the second embodiment.

In the second embodiment, it is possible to increase the transmission speed by using a plurality of FH patterns. However, carrier sense needs to be cleared in a plurality of channels; therefore, transmission opportunities are limited. In the present embodiment, a method of minimizing a decrease in transmission opportunities is disclosed.

When a plurality of frequency channels are simultaneously used by using a plurality of FH patterns, in order to minimize a decrease in transmission opportunities, it is sufficient to select a frequency having a high correlation at which transmission of other systems is simultaneously performed in a plurality of frequency channels. For example, because a wireless LAN of an IEEE802 system is a main interference source in an ISM band, it is highly likely that interference occurs in 18 MHz to 22 MHz units, which are bandwidths of the wireless LAN. Therefore, when a plurality of FH patterns are used, as shown in FIG. 8, it is possible to realize suppression of a decrease in transmission opportunities by selecting FH patterns in which frequency channels within a fixed bandwidth (e.g., 22 MHz bandwidth) are used at the same time.

In particular, when the IEEE 802 system wireless LAN is predicted as an interference source, channel numbers 1, 6, 11, and 14 in the ISM band near 2.4 gigahertz are often used as a center frequency. That is, it is effective to select FH patterns such that a plurality of frequency channels used at the same time in a plurality of FH patterns are all within the same range in the ranges within 22 megahertz respectively centering on ch1 (2412 MHz), ch6 (2437 MHz), ch11 (2462 MHz), and ch14 (2484 MHz). By configuring the radio communication system as explained above, if the carrier sense is cleared in a frequency channel used in any one of a plurality of FH patterns, it is highly likely that the carrier sense is cleared in all the FH patterns; therefore it is possible to increase the transmission opportunities compared with the second embodiment.

Further, it is effective to select FH patterns such that frequency channels temporally adjacent to each other of each FH pattern are not present within the same 22 MHz bandwidth (each of the frequency channels is present within a different 22 MHz bandwidth). The operation in the present embodiment other than the operation explained above is the same as the operation in the second embodiment.

As explained above, in the present embodiment, when a plurality of FH patterns are used, FH patterns are selected such that frequency channels used at the same time by the FH patterns are within a fixed bandwidth. Therefore, it is possible to increase transmission opportunities compared with the second embodiment.

Fourth Embodiment

Figure 9:
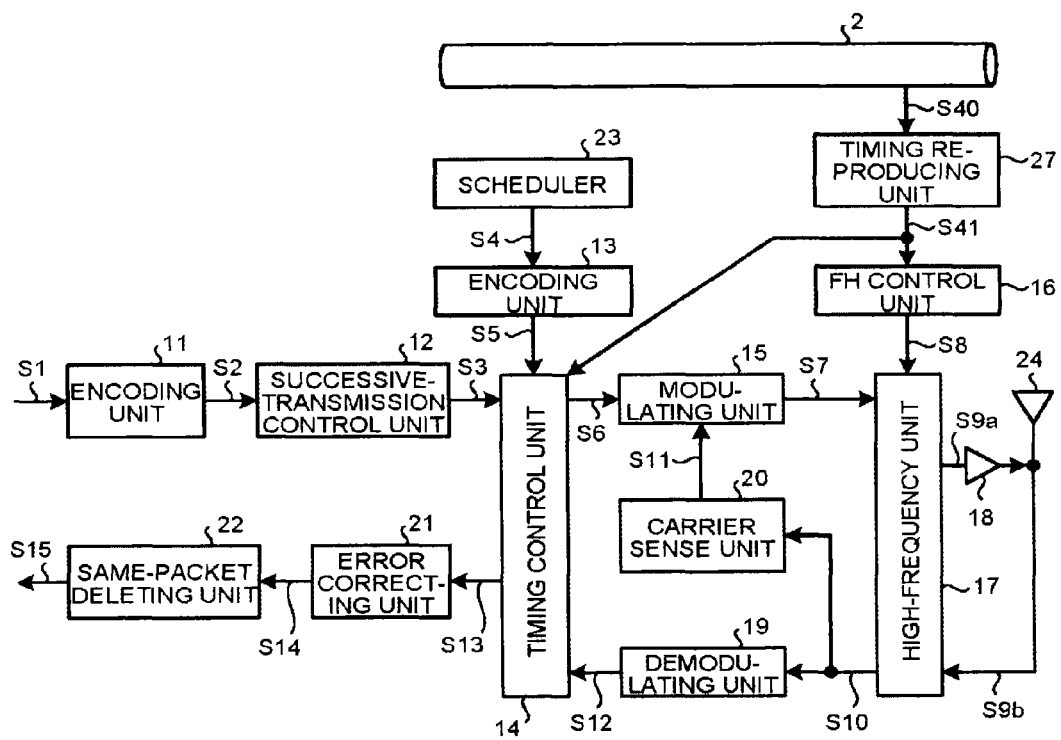
FIG. 9 is a diagram of a configuration example of a base station in a fourth embodiment.

FIG. 9 is a diagram of a configuration example in a fourth embodiment of the base station according to the present invention. As shown in FIG. 9, the base station in the present embodiment is the same as the base stations 1-1 to 1-3 in the first embodiment except that a timing reproducing unit 27 is added to the base stations 1-1 to 1-3 in the first embodiment. A radio communication system in the present embodiment is the same as the radio communication system in the first embodiment except that the base stations 1-1 to 1-3 are the base station in the present embodiment. Constituent elements having the same functions as the functions in the first embodiment are denoted by reference numerals and signs same as the reference numerals and signs in the first embodiment. Redundant explanation of the constituent elements is omitted. Differences from the first embodiment are mainly explained below.

In a system that uses FH, synchronization of FH patterns is necessary to perform communication between a base station and a mobile station. However, when the operation of the system is performed using a large number of FH patterns, it is extremely difficult to estimate FH patterns used in the base station and pattern start timings of the FH patterns. In particular, in a train control system in which handover of a base station occurs one after another according to high-speed movement, in order to suppress radio line disconnection, a function for supplementing FH patterns at high speed during the handover is important.

The timing reproducing unit 27 in the present embodiment is connected to the backbone line 2 that connects base stations. The timing reproducing unit 27 receives a time synchronization signal S40 from the backbone line 2 and generates an operation timing pulse S41 of the base station on the basis of the time synchronization signal S40. The time synchronization signal S40 transmitted from the backbone line 2 can be transmitted from, for example, a time synchronization server (not shown in the figure) connected to the backbone line 2 or can be transmitted from the command center 3.

Figure 10:
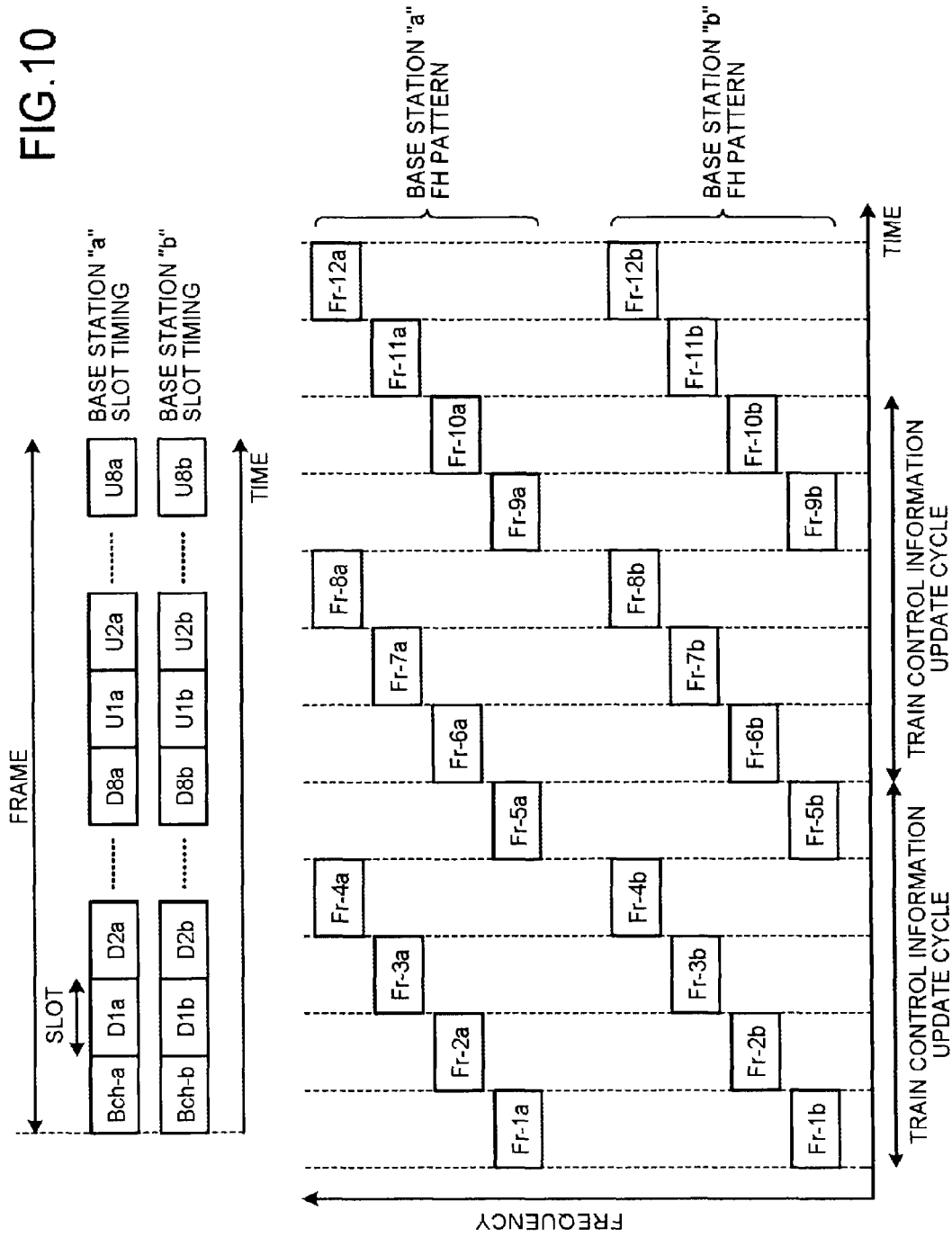
FIG. 10 is a diagram of an example of frames and slot start timings of two base stations in the fourth embodiment.

FIG. 10 is a diagram of an example of frames and slot start timings of two base stations (a base station "a" and a base station "b") in the present embodiment. The base stations "a" and "b" generate, using the time synchronization signal S40 supplied from the backbone line 2, the operation timing pulse S41 including FH pattern start timing, frame start timing, and slot start timing, which is the same between the base stations "a" and "b". As shown in FIG. 10, the base stations "a" and "b" perform, on the basis of the timing pulse S41, transmission and reception with mobile stations in the respective cells using the same FH pattern start timing, frame start timing, and slot start timing. In FIG. 10, two base stations are illustrated. However, actually, all the base stations generate the operation timing pulse S41 on the basis of the time synchronization signal S40 in the same manner to thereby synchronize the FH pattern start timing, the frame start timing, and the slot start timing. Because the mobile stations operate independent from one another, transmission timings in the slots are independent among the mobile stations. Note that the configuration of the mobile stations mounted on the trains 4 and 5 in the present embodiment is the same as the configuration in the first embodiment.

In the train control system, in many cases, the moving direction of the mobile stations is one dimensional. The mobile stations retain FH patterns of handover destination base stations and operate assuming that the FH patterns of the handover destination base stations are known. Because of the characteristic of the train control system, the trains each know their instantaneous geological positions. Therefore, it is possible to perform handover using present position information as a trigger. That is, during system design, during station placement, or the like, a handover point is determined in advance and a mobile station mounted on a train retains information concerning the handover point. When detecting that the mobile station reaches the handover point on the basis of the present location information on the train, the mobile station can carry out handover. In this case, in the present embodiment, the FH pattern start timing, the frame start timing, and the slot start timing are synchronized between base stations adjacent to each other. Therefore, the mobile station can calculate a frequency channel of the next frame of the adjacent base stations and can receive a signal from a handover destination base station without causing line disconnection (a beacon search from the base stations).

According to the present embodiment, it is possible to perform base station switching (handover) without instantaneous interruption. Therefore, it is possible to greatly suppress a transmission delay of control information.

Note that the time synchronization signal S40 to the base stations is not limited to the supply from the backbone line 2. The time synchronization signal S40 can be supplied from other means such as a GPS (Global Positioning System). The FH pattern start timing between the base stations does not always need to be the same. An equivalent effect can be obtained if an amount of timing deviation (unit: number of frames) is known.

During handover, the mobile station acquires free slot information from notification information, uses the free slot as a random access channel, and transmits an entry request to a new base station. The operation in the present embodiment other than the operation explained above is the same as the operation in the first embodiment. When the base stations explained in the second or third embodiment use a plurality of FH patterns, the timing synchronization in the present embodiment can be used.

As explained above, in the present embodiment, in the base stations, the timing reproducing unit 27 generates the operation timing pulse S41 of the base stations on the basis of the time synchronization signal S40 from the backbone line 2. Therefore, an effect same as the effect in the first embodiment can be obtained. It is possible to perform base station switching without instantaneous interruption. Therefore, it is possible to greatly suppress a transmission delay of control information.

Fifth Embodiment

Figure 11:
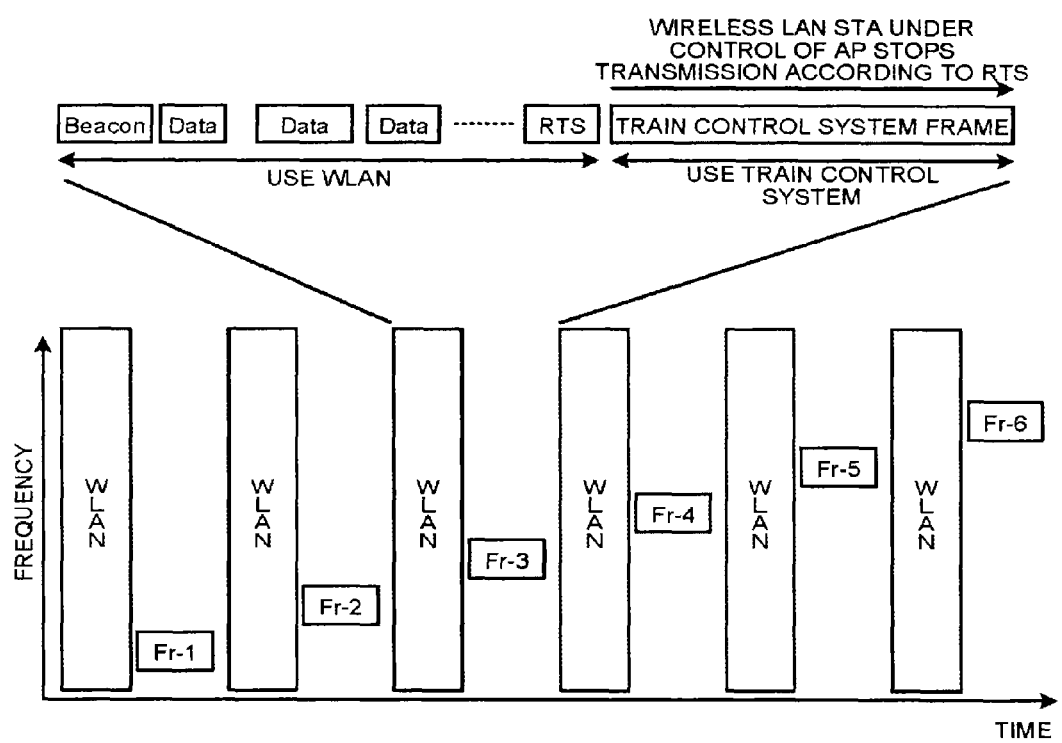
FIG. 11 is a diagram of an example of transmission timings in a fifth embodiment.

FIG. 11 is a diagram of an example of transmission timings in a fifth embodiment according to the present invention. The configuration of a radio communication system in the present embodiment is the same as the configuration in the first embodiment. The configurations of a base station and a mobile station are also the same as the configurations in the first embodiment.

In recent years, communication services for passengers by wireless LANs are widely used in public transportations such as trains. When a train control system is configured using an ISM band, it is likely that a wireless LAN for passengers and the train control system operated by the same operator cause interference in the same frequency band. In the present embodiment, a method for avoiding interference due to the wireless LAN in such a case is disclosed.

In the present embodiment, because, for example, the wireless LAN and the train control system are operated by the same operator, it is possible to control operations concerning not only the train control system but also the wireless LAN. As shown in FIG. 11, the wireless LAN (WLAN) and the train control system that uses FH share the same band (however, instantaneous bandwidths are different). The wireless LAN and the train control system have the same beacon period. First, an AP (Access Point) of the wireless LAN transmits a beacon and performs communication with a subordinate STA (Station). After a fixed time, the AP transmits an RTS (Request To Send) or a CTS (Clear To Send) to thereby prohibit the subordinate STA in the wireless LAN system from performing transmission for a predetermined time (a transmission prohibition time). Thereafter, the train control system starts transmission and completes transmission and reception within time reserved by the RTS (the transmission prohibition time).

The transmission timings shown in FIG. 11 are an example. Transmission timings only have to be transmission timings for causing the wireless LAN and the train control system to operate in a time division manner and are not limited to the example shown in FIG. 11. The operations of the base station and the mobile station in the train control system in the present embodiment are the same as the operations in the first embodiment except that transmission times of frames are defined as shown in FIG. 11. When the operation in any one of the second to fourth embodiments is performed, the transmission times of the frames can be defined as shown in FIG. 11 to realize the interference avoidance in the present embodiment.

As explained above, in the present embodiment, the wireless LAN and the train control system are caused to operate in a time division manner. Therefore, even when it is necessary to operate the wireless LAN and the train control system within a short distance, it is possible to realize the operation of the system without causing performance deterioration due to interference.

INDUSTRIAL APPLICABILITY

As explained above, the radio communication apparatus and the radio communication system according to the present invention are useful for a train control system and, in particular, suitable for a train control system that uses an ISM band.

REFERENCE SIGNS LIST

1-1 to 1-3 base station, 2 backbone line, 3 command center, 4, 5 train, 11, 13 encoding unit, 12 successive-transmission control unit, 14 timing control unit, 15 modulating unit, 16 FH control unit, 17 high-frequency unit, 18 unit amplifier, 19 demodulating unit, 20 carrier sense unit, 21 error correcting unit, 22 same-packet deleting unit, 23 scheduler, 24 antenna, 25 notification-channel analysis unit, 26 combining unit, 27 timing reproducing unit.

The invention claimed is:

1. A radio communication apparatus comprising:
   a hopping control unit that gives an instruction concerning a frequency channel to be used in communication in units of a switching cycle;
   a carrier sense unit that performs, in an allocation unit that is obtained by dividing the switching cycle, carrier sense on the frequency channel to be used;
   an interference-avoidance-timing control unit that determines transmission timing in the allocation unit on a basis of a result of the carrier sense;
   a successive-transmission control unit that generate a plurality of pieces of same data by duplicating transmission data; and
   a scheduler that allocates, as a communication time period, the allocation unit that is obtained by dividing the switching cycle to each of one or more communication partners, wherein
   the radio communication apparatus transmits, on a basis of an allocation result of the communication time period by the scheduler, the transmission timing, and the instruction by the hopping control unit, the plurality of pieces of same data generated from same transmission data to the communication partners at the switching cycles different from each other and notifies the communication partners of the allocation result at each of the switching cycles.

2. The radio communication apparatus according to claim 1, further comprising a timing reproducing unit that performs time synchronization between the radio communication apparatus and another radio communication apparatus having a same function, wherein
   the radio communication apparatus synchronizes start timing of a frequency hopping pattern and start timing of the switching cycle with the another radio communication apparatus.

3. The radio communication apparatus according to claim 1, wherein the communication time period is allocated in a time division manner between the radio communication apparatus and a wireless LAN (Local Area Network) access point.

4. The radio communication apparatus according to claim 3, wherein
the wireless LAN (Local Area Network) access point instructs a subordinate terminal to prohibit transmission for a transmission prohibition period, and
the scheduler allocates a communication time period of the radio communication apparatus such that communication is performed during the transmission prohibition period.

5. The radio communication apparatus according to claim 1, wherein the interference-avoidance-timing control unit determines, as the transmission timing, a point in time when a signal that is equal to or larger than a threshold is not detected for a fixed time by the carrier sense.

6. The radio communication apparatus according to claim 5, wherein the fixed time is set to be equal to or longer than an SIFS (Short Interframe Space) and equal to or shorter than a PIFS (PCF (Point Coordination Function) Interframe Space).

7. The radio communication apparatus according to claim 5, wherein
the radio communication apparatus performs transmission and reception using a plurality of frequency hopping patterns simultaneously, sets the transmission timing same among all frequency channels to be used simultaneously, and, when the signal that is equal to or larger than the threshold is not detected for the fixed time by the carrier senses used simultaneously, carries out transmission in the allocation unit.

8. The radio communication apparatus according to claim 7, wherein the frequency channels to be used simultaneously are within one band among a plurality of bands having a specified frequency width.

9. The radio communication apparatus according to claim 8, wherein the specified frequency width is set to be equal to or smaller than 22 megahertz.

10. The radio communication apparatus according to claim 9, wherein center frequencies of the bands are set to 2412 megahertz, 2437 megahertz, 2462 megahertz, and 2484 megahertz, which are center frequencies of a wireless LAN (Local Area Network).

11. The radio communication apparatus according to claim 8, wherein the radio communication apparatus sets frequency channels temporally adjacent to each other in the frequency hopping pattern in the bands different from each other.

12. The radio communication apparatus according to claim 1, wherein the radio communication apparatus performs different encoding processing on each of the pieces of same data generated from same transmission data and transmits the same data.

13. The radio communication apparatus according to claim 1, wherein the radio communication apparatus performs, according to a different modulation scheme, modulation processing on each of the pieces of same data generated from same transmission data and transmits the same data.

14. The radio communication apparatus according to claim 1, wherein the radio communication apparatus sets the radio communication apparatus or the communication partner as an apparatus mounted on a train and sets, for each of trains, a number of times of successive transmission, which is a number of the pieces of same data generated from same transmission data.

15. The radio communication apparatus according to claim 1, wherein the radio communication apparatus sets, for each link, a number of times of successive transmission, which is a number of the pieces of same data generated from same transmission data.

16. A radio communication apparatus comprising:
a hopping control unit that gives an instruction concerning a frequency channel to be used in communication in units of a switching cycle;
a carrier sense unit that performs, in an allocation unit that is obtained by dividing the switching cycle, carrier sense on the frequency channel to be used;
an interference-avoidance-timing control unit that determines transmission timing in the allocation unit on a basis of a result of the carrier sense;
a successive-transmission control unit that generate a plurality of pieces of same data by duplicating transmission data; and
an analysis unit that extracts, from a reception signal received from a communication partner, an allocation result that is included in the reception signal and indicates a communication time period allocated to the radio communication apparatus in the allocation unit that is obtained by dividing the switching cycle, wherein
the radio communication apparatus transmits, on a basis of the allocation result extracted by the analysis unit, the transmission timing, and the instruction by the hopping control unit, the plurality of pieces of same data generated from same transmission data at the switching cycles different from each other.

17. The radio communication apparatus according to claim 16, wherein
the radio communication apparatus has a plurality of communication partners, and the communication partners synchronize start timing of a frequency hopping pattern and start timing of the switching cycle with each other, and
the radio communication apparatus retains, for each of the communication partners, a frequency hopping pattern used between the radio communication apparatus and a communication partner, determines, on a basis of a position of the radio communication apparatus, whether a communication partner is switched, and, when determining that a communication partner is switched, performs communication using a retained frequency hopping pattern corresponding to a switching destination communication partner.

18. The radio communication apparatus according to claim 17, wherein the radio communication apparatus sets the allocation unit as a slot, acquires a position of a free slot from the switching destination communication partner, and transmits a connection request to the switching destination communication partner by using the free slot.

19. The radio communication apparatus according to claim 16, wherein the communication time period is allocated in a time division manner between the radio communication apparatus and a wireless LAN (Local Area Network) access point.

20. The radio communication apparatus according to claim 16, wherein the interference-avoidance-timing control unit determines, as the transmission timing, a point in time when a signal that is equal to or larger than a threshold is not detected for a fixed time by the carrier sense.

21. The radio communication apparatus according to claim 16, wherein the radio communication apparatus performs different encoding processing on each of the pieces of same data generated from same transmission data and transmits the same data.

22. The radio communication apparatus according to claim 16, wherein the radio communication apparatus performs, according to a different modulation scheme, modulation processing on each of the pieces of same data generated from same transmission data and transmits the same data.

23. The radio communication apparatus according to claim 16, wherein the radio communication apparatus sets the radio communication apparatus or the communication partner as an apparatus mounted on a train and sets, for each of trains, a number of times of successive transmission, which is a number of the pieces of same data generated from same transmission data.

24. The radio communication apparatus according to claim 16, wherein the radio communication apparatus sets, for each link, a number of times of successive transmission, which is a number of the pieces of same data generated from same transmission data.

25. A radio communication system comprising a base station and a mobile station,
the base station and the mobile station each includes:
  a hopping control unit that gives an instruction concerning a frequency channel to be used in communication in units of a switching cycle;
  a carrier sense unit that performs, in an allocation unit that is obtained by dividing the switching cycle, carrier sense on the frequency channel to be used;
  an interference-avoidance-timing control unit that determines transmission timing in the allocation unit on a basis of a result of the carrier sense; and
  a successive-transmission control unit that generate a plurality of pieces of same data by duplicating transmission data, wherein
the base station includes a scheduler that allocates, as a communication time period, the allocation unit that is obtained by dividing the switching cycle to each of one or more mobile stations,
the base station transmits, on a basis of an allocation result of the communication time period by the scheduler, the transmission timing, and the instruction by the hopping control unit, the plurality of pieces of same data generated from same transmission data to the mobile stations at the switching cycles different from each other and notifies the mobile stations of the allocation result at each of the switching cycles, and
the mobile station includes an analysis unit that extracts the allocation result from a reception signal received from the base station, and
the mobile station transmits, on a basis of the allocation result extracted by the analysis unit, the transmission timing, and the instruction by the hopping control unit, the plurality of pieces of same data generated from same transmission data at the switching cycles different from each other.

* * * * *